Patented Sept. 15, 1936

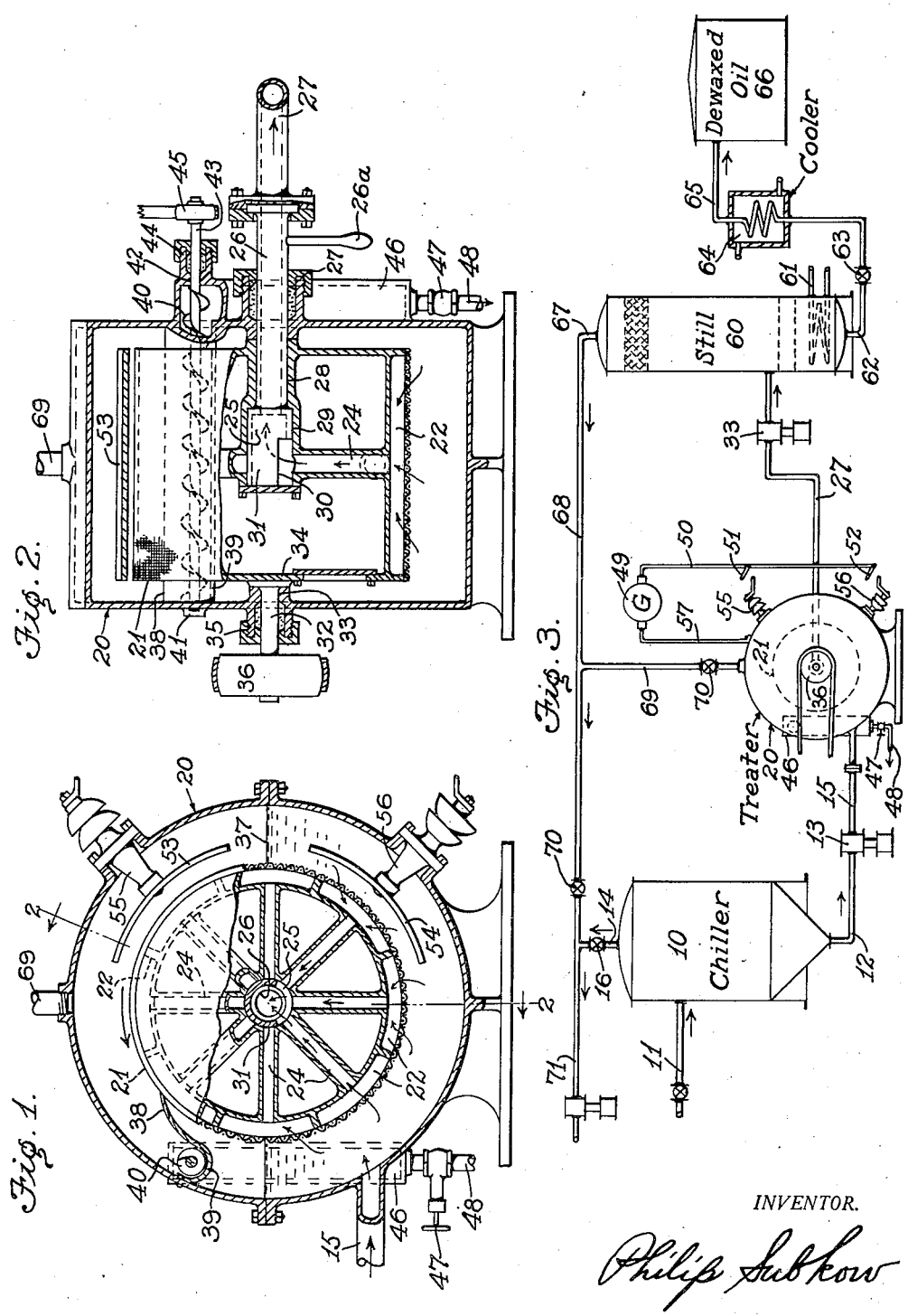

2,054,273

UNITED STATES PATENT OFFICE 2,054,273

PROCESS AND APPARATUS FOR DEWAXING OIL

Philip Subkow, Los Angeles, Calif., assignor to Union Oil Company of California, Los Angeles, Calif., a corporation of California Application December 26, 1933, Serial No. 703,909

9 Claims. (Cl. 204—24)

This invention relates to separation of wax from oil. It relates more particularly to electrical separation of wax suspensions from oil and the electrical separation of oil from such wax accumulations or cakes as are formed in filtration operations.

In the separation of wax from wax-bearing oils by conventional filtration methods, the wax-bearing oil is chilled in the presence of a suitable diluent to a temperature at which the wax is precipitated from solution in the oil in the form of a finely divided suspension of wax particles or crystals. The wax thus forming the suspended precipitate is then subsequently removed from the oil by passing the mixture through a suitable filter where the wax is collected upon the filter surfaces, and from which, after passing through the filter surfaces, the wax-free oil is withdrawn.

It is necessary to remove the wax layer or cake which thus accumulates on the filter surfaces after relatively short periods of operation thereof, in order to maintain the filter in operative condition. In the ordinary type of closed filter it is necessary at these periods to stop the flow, withdraw the oil and open the filter before the wax can be mechanically dislodged or washed from the filter surfaces. This necessitates intermittent operation.

In another type of filtration operation, a revolving drum is employed which carries the filter on the cylindrical surface thereof and which is partially submerged in the waxy oil to be filtered. As the drum rotates, new filter surface is constantly brought into contact with the waxy oil while the filter surface which has accumulated wax is constantly withdrawn from contact with the oil and the wax removed therefrom while out of contact with the said oil. This type of filter allows continuous operation.

In either of the hereinbefore described types of filtering operations the wax which is removed from the filter surfaces contains a relatively large quantity of occluded oil or oil which remains in the interstices between the minute particles or crystals which comprise these accumulations. The disposal of this wax, saturated with oil has always been a difficult and wasteful process.

It is, therefore, an object of this invention to improve filtering operations; to facilitate the removal and disposal of separated wax from the filter; to facilitate the removal and recovery of occluded oil from the separated wax, and to minimize the loss of the valuable oil ordinarily contained in the wax.

The objects of this invention are accomplished, in general, by providing a method employing electro-osmosis in connection with filtration for removing oil from the filter cake.

The invention is embodied in apparatus comprising a segmental rotary filter adapted to operate under suitable differential pressures, and electrodes placed in electrostatic relation to the filter surfaces so that separated wax carried on these surfaces can be subjected to an intense electric field.

The apparatus comprises, in brief, a pressure tight tank adapted to contain wax-bearing oil to be filtered. Inside of this tank rotatably supported and partially submerged in the oil, is a segmental, rotary filter. In the upper portion of the tank above the oil surface, a stationary insulated electrode having a cylindrical surface, is supported with its axis of curvature coincident with the axis of the drum and in electrostatic relation with the drum surface. An electrode of similar construction is provided in the lower portion of the tank below the oil surface. Pipe connections are provided to the filter through the tank wall and through suitable packed, valved connections in the drum shaft so that a pressure differential can be imposed upon, and filtrate withdrawn from, only those segments of the filter on the drum surface which are in contact with the waxy oil. Provision is also made whereby the said connections can be established also with those filter segments which come into spaced relation with the insulated electrodes during the rotation of the drum, and during treatment, as described hereinafter. Means is provided whereby electrical connection can be made with the insulated electrodes inside of the tank, making it possible to impress a high electric potential between the filter body and said electrode, and through the moving wax cake which adheres to the filter surface. A scraper is provided in the tank making contact with the filter surface so that the wax cake may be removed from the filter surface subsequent to its movement into electrostatic relation to the insulated electrodes.

The invention broadly stated comprises a process and apparatus for removing oil from a body of wax by means of an electric field. The invention more specifically stated comprises a process and apparatus whereby wax precipitate may be removed from wax-bearing oil by means of filtration with subsequent recovery of oil from the wax filter cake by means of the effect of electro-osmosis; and whereby electro-osmosis may be effected simultaneously with the maintenance of a differential pressure upon the filter leaf to aid in the passage of the oil through and out of the filter and filter cake; and whereby the electrically treated filter cake is removed from the filter surface out of contact with the wax-bearing oil or filtrate.

The accompanying drawing illustrates one embodiment of the invention in which Figure 1 is a side sectional elevation through the treater unit. Figure 2 is a longitudinal section taken on line 2—2 of Figure 1 and Figure 3 illustrates the general arrangement of the apparatus.

The treater unit illustrated in Figures 1 and 2 comprises a cylindrical shell or tank 20 enclosing, co-axially, a rotatable filter drum 21. The drum 21 is provided with a number of segmental filters 22 around the periphery thereof, each of which are connected through radial pipes 24 to a central hub or distributor 25 which is in turn connected with a hollow shaft 26 which passes out of the shell 20 through stuffing box 27. The filters utilized here may be of the well known type comprising a backing of a heavy metal mesh or screen over which is placed a suitable cloth or canvas filter body. Shaft 26 serves both as an outlet for filtrate from the segmental filters 22 and as a shaft upon which one end of the drum rotates in bearing 28. The hollow shaft 26 makes a liquid tight fit inside a cylinder 29 into which the radial connecting pipes 24 lead. The end of hollow shaft 26 is notched as shown at 30, so that, normally, only the radial connecting pipes leading to the submerged filter segments are in communication with the hollow shaft 26, while those radial connections leading from the filter segments not in contact with the liquid in the treater are closed by the semi-cylindrical portion 31 of the notched end 30. By rotation of shaft 26 in stuffing box 27 by means of handle 26a through any desired angular displacement, the point at which the filter segments are in communication with the hollow shaft during the rotation of the drum can be governed. Also by changing the size of the notch 30 and thereby changing the length of the cylindrical segment 31, filter segments may be maintained in communication with shaft 26 whether in contact or out of contact with the fluid in the shell. The opposite end of drum 21 is carried by shaft 32 which rotates in bearing 33 supported in turn by the end 34 of the enclosing cylinder 20. The shaft 32 extends through a stuffing box 35 and terminates in a pulley 36 by means of which the drum may be rotated.

A pair of electrodes 53 and 54 having surfaces which are cylindrical segments are supported in co-axial spaced relation with the filter drum 21 by means of lead-in insulator bushings 55 and 56.

The liquid to be filtered enters the treater shell 10 through an inlet connection 15 and the said liquid is maintained at a level which is approximately indicated by liquid level line 37. As explained hereinbefore, the liquid under suitable differential pressure is forced through the filter surfaces of the submerged filter segments and the resultant filtrate withdrawn from the treater through radial connections 24 and outlet shaft 26.

Scraper 38 located in the vapor space of the treater makes contact with the moving filter surfaces of the drum for the purpose of removing the waxy layer or filter cake. Wax removed by the scraper moves by gravity down into the semi-cylindrical trough 39 in which is located a spiral conveyor 40 mounted on bearings 41 and 42 and rotatable by means of shaft 43 passing through stuffing box 44 and terminating in pulley 45. A rectangular receiving tank 46 is provided on the side of the treater into which the said spiral conveyor extends and through which wax removed by the scraper is projected. Wax is ejected from tank 46 under suitable differential pressure through valve 47 and line 48.

In the general assembly, Figure 3, 10 is a chilling tank into which the waxy oil, along with any suitable liquid, normally gaseous diluent, may be introduced at reduced pressure through line 11. As previously stated, 20 is the filter and electric treater tank. A high potential electric generator 49 supplies the high potential electric current to the electrodes within the filter tank shell 20. Electrical connection is selectively made from the generator to the electrodes in the tank 20 through the conductor 50 and through lead-in insulator bushings 55 and 56 by means of switches 51 and 52. A still 60 is provided for separating the oil-filtrate and diluent received from the filter 20. Dewaxed oil from the bottom of the still 60 is delivered to the dewaxed oil storage tank 66.

The operation is as follows: The wax-bearing oil dissolved in a suitable diluent, such as propane, at a temperature above that at which wax precipitate is formed is introduced into chiller 10 through line 11. A portion of the propane is allowed to evaporate in chiller 10 at reduced pressure in order to reduce the temperature of the solution to a point at which wax is precipitated. The resultant mixture containing precipitated wax is withdrawn from the bottom of the chiller 11 through the outlet line 12 and forced by means of pump 13 through line 15 into the filter shell or tank 20. The solvent vapors from the chiller 10 are withdrawn at the top through outlet 14 and valve 16 and join the vapors from the still returning to the solvent recovery system. The pressure in the chiller 10, and thereby the degree of chilling of the chiller contents, is governed by the valve 16. The filtrate from the segmental filters 22 after passing through the radial pipe connections 24 is withdrawn through the hollow outlet shaft 26 and line 27 and by means of pump 33 forced into the still 60 where evaporation and separation of the diluent takes place. Heat is applied to the still through heating coil 61. The solvent vapors from still 60 are withdrawn through vapor outlet 67 and returned under reduced pressure through line 68, valve 70 and line 71 to the solvent recovery system. Likewise, vapors are withdrawn from the top of filter shell 20 through line 69 and valve 70. The diluent free dewaxed-oil filtrate is withdrawn from the bottom of the still through outlet 62, valve 63, cooler 64 and delivered through line 65 to the dewaxed-oil storage tank 66.

The differential pressure across the filter leaves of the filter segments 22 is maintained by means of pumps 13 and 33 located on the inlet and outlet, respectively, of the filter shell 20. The oil and solvent solution initially containing precipitated wax which is thus forced through the filter, leaves an accumulation or layer of the precipitated wax commonly known as the "filter cake" on the outside surfaces thereof. As these filter surfaces become thus coated with wax they are constantly removed from contact with the liquid and clean filter surfaces free from wax are constantly brought into contact with the liquid by means of the rotation of the drum 21 upon which said filter surfaces are carried. The filter surfaces carrying a layer or cake of wax after being removed from the solution move into a position adjacent to a closely spaced electrode 53 which is charged to a high potential difference with respect to the filter body. The said wax cake is thus subjected to an intense electric field. By maintaining the electrode 53 at a negative potential with respect to the filter body the electric field to which the said wax cake is subjected will be such that electro-osmosis of such a character will be effected within the wax cake as to cause the oil contained therein to move through the wax toward the outside surface thereof, from which point it is easily drained or washed. The wax filter cake is thus "dried" or freed from a large percentage of occluded oil.

The thus "dried" cake continues to move with the rotation of the drum until it comes in contact with a scraper 38 where it is removed from the surface of the filter and allowed to fall into the trough 39 within the upper portion of the filter shell 20 where it comes in contact with and is ejected from the filter shell 20 by means of a rotating spiral conveyor 40. The said ejected wax from trough 39 falls into the wax receiving tank 46 from which it is removed through valve 47 and wax disposal line 48. The spiral conveyor 40 is supported on suitable bearings 41 and 42 and is rotated by means of pulley 45 through shaft 43 which passes through stuffing box 44 located in the side of said wax receiving tank 46.

The semi-cylindrical portion 31 of the notched end 25 of shaft 26 acts as a rotary valve on the inner ends of the radial connecting pipes 24 and normally the hollow filtrate outlet shaft 26 carrying the notched end 30 is in a position, as shown in Figure 1, so that only the filter segments in contact with the liquid in the filter shell are in communication with the outlet 26. By a rotational displacement of the hollow outlet shaft 26 by means of handle 26a, the point during rotation of the filter drum at which the filter segments are subjected to a differential pressure may be regulated. Thus, by rotating shaft 26 in a counter-clockwise direction, as viewed in Figure 1, differential pressure may be maintained not only upon the filter segments in contact with the liquid but upon those filter segments upon which wax has accumulated and which have been moved into the gas space above the liquid. Thus, if it is so desired "drying" of the filter cake may be partially accomplished by maintaining the differential pressure upon the filter after it has been moved into the gas space in the treater. By charging the electrode 53 positively with respect to the filter body electro-osmosis may be effected within said filter cake to aid the hereinabove described method of "drying" the filter cake by means of the differential pressure maintained upon the filter surface in the gas space. Under these conditions the occluded oil will move out of the wax cake into the filter and be withdrawn through the filtrate outlet.

An auxiliary electrode 54, similar to electrode 53, is provided in the lower portion of the filter tank 20 in electrostatic relation to the filter body in contact with the liquid to be filtered. By maintaining a negative charge on the electrode 54 with respect to the filter body, oil occluded in the wax cake may be largely removed therefrom and returned to the liquid in the filter shell by means of electro-osmosis. When the apparatus is so operated the hollow outlet shaft 26 is angularly displaced in a clockwise direction so that the filter segments in the liquid opposite electrode 54 will not be in communication with the filtrate outlet and thus will, at this point, be relieved from any differential pressure which would tend to prevent the favorable action of the electro-osmosis.

Either or both of the electrodes 53 and 54 are connected by means of switches 51 and 52, respectively, through conductor 50 to the high potential generator 49. The return connection from the generator is made through conductor 57 to the filter shell 20.

The temperature of the wax-bearing oil is ordinarily reduced in the chiller 10 to between —20 and —40° F. depending upon the pour point desired in the finished product. This temperature is maintained throughout the filtering and electrical treating process in tank 20 but under sufficient pressure to prevent ebullition and agitation detrimental to successful filtering and electrical treating.

The cooling rates of the contents of the chilling tank may be governed by the rate of evacuation or withdrawal of vapors therefrom through valve 16 to obtain a range of cooling conditions varying from "batch chilling" to "flash chilling". If it is desired to "batch chill" or slowly chill the oil or oil-diluent solution, the pressure upon the contents of the chilling tank is slowly reduced over the desired period of time and at the desired rate until the minimum desired temperature is attained, at which point the said contents are withdrawn and allowed to pass to the filter 20. If it is desired to cool quickly or "shock chill", the oil-diluent solution is allowed to flash continuously from the inlet 11 into the chiller 10 which is maintained at reduced pressure and the chilled contents are continuously withdrawn therefrom through outlet line 12 to the filter shell 20.

An average potential gradient of from 25,000 to 75,000 volts per inch maintained between the electrodes and the filter body has been found effective.

The process and apparatus is not limited to the specific structure nor to the treatment of oil for the removal of wax but they are applicable to the treatment of similar substances for the removal of asphaltines. asphalt, petrolatum, sludges, finely divided solids and other substances and impurities both solid and plastic.

The foregoing is merely illustrative of one apparatus and the invention is not limited thereby but may include any process and apparatus which accomplishes the same within the scope of the invention.

I claim:

1. A process for dewaxing oil comprising filtering the mixture of wax-bearing oil containing precipitated wax to separate wax from the oil and to produce a wax layer on the filter surface, removing said filter surface supporting said wax layer from contact with said wax-bearing oil, subjecting the thus formed wax layer to a high potential electric field to draw occluded oil to the outer surface of said wax layer and removing the oil thus drawn to the surface of the wax layer under the influence of the electric field by gravity separation.

2. A process for dewaxing oil comprising precipitating wax in the oil, filtering the mixture of wax-bearing oil containing precipitated wax to separate wax from the oil and to produce a wax layer on the filter surface, removing said filter surface supporting said wax layer from contact with said wax-bearing oil, subjecting the thus formed wax layer to a high potential electric field to draw occluded oil to the outer surface of said wax layer and removing the oil thus drawn to the surface of the wax layer under the influence of the electric field by gravity separation.

3. A process for dewaxing oil comprising chilling the wax-bearing oil to precipitate wax, filtering the mixture of wax-bearing oil containing precipitated wax to separate wax from the oil and to produce a wax layer on the filter surface, removing said filter surface supporting said wax layer from contact with said wax-bearing oil, subjecting the thus formed wax layer to a high potential electric field to draw occluded oil to the outer surface of said wax layer and removing the oil thus drawn to the surface of the wax layer under the influence of the electric field by gravity separation.

4. A process for dewaxing oil comprising filtering the mixture of wax-bearing oil containing precipitated wax to separate wax from the oil and to produce a wax filter cake, removing said wax filter cake from contact with said wax-bearing oil, subjecting the thus formed wax cake while out of contact with the oil being filtered, to a high potential electric field to draw occluded oil to the outer surface of said wax filter cake and removing the oil thus drawn to the wax filter cake surface under the influence of the electric field by gravity separation.

5. A process for dewaxing oil comprising simultaneously filtering and electrically depositing wax from the mixture of wax-bearing oil containing precipitated wax to separate wax from the oil and to produce a wax layer on the filter surface, removing said filter surface supporting said wax layer from contact with said wax-bearing oil, subjecting the thus formed wax layer to a high potential electric field to draw occluded oil to the outer surface of said wax layer and removing the oil thus drawn to the surface of the wax layer under the influence of the electric field by gravity separation.

6. A process for dewaxing oil comprising filtering the mixture of wax-bearing oil containing precipitated wax to separate wax from the oil and to produce a wax layer on the filter surface, removing said filter surface supporting said wax layer from contact with said wax-bearing oil, simultaneously subjecting the thus formed wax layer to a high potential electric field and to gas pressure to force occluded oil to the outer surface of said wax layer and removing the oil thus drawn to the outer surface of the wax layer under the influence of the electric field and the gas pressure by gravity separation.

7. A proces for removing oil from a filter cake which comprises establishing an electric field between a surface supporting the filter cake and an electrode spaced from said filter cake to draw occluded oil to the outer surface thereof and removing the oil thus drawn to the surface of the filter cake by gravity separation.

8. Apparatus for dewaxing oil comprising a filter surface, means to pass oil from the mixture of wax-bearing oil containing precipitated wax through said filter surface to separate wax from the oil and to produce a wax cake on said filter surface, means to remove said filter surface supporting said wax cake from contact with said wax-bearing oil and means out of contact with said wax cake to subject the wax cake on said filter surface to an electric field while out of contact with said wax-bearing oil whereby occluded oil drawn to the outer surface of said wax cake under the influence of the said electric field may separate by gravity.

9. Apparatus for dewaxing oil comprising a filter surface, means to pass oil from the mixture of wax-bearing oil containing precipitated wax through said filter surface to separate wax from the oil and to produce a wax cake on said filter surface, means to remove said filter surface supporting said wax cake from contact with said wax-bearing oil, means out of contact with said wax cake to subject the wax cake on said filter surface to an electric field while out of contact with said wax-bearing oil whereby occluded oil drawn to the outer surface of said wax cake under the influence of the said electric field may separate by gravity and means to continuously remove the thus treated wax cake from the filter surface.

PHILIP SUBKOW.